United States Patent Office 2,959,707
Patented Nov. 8, 1960

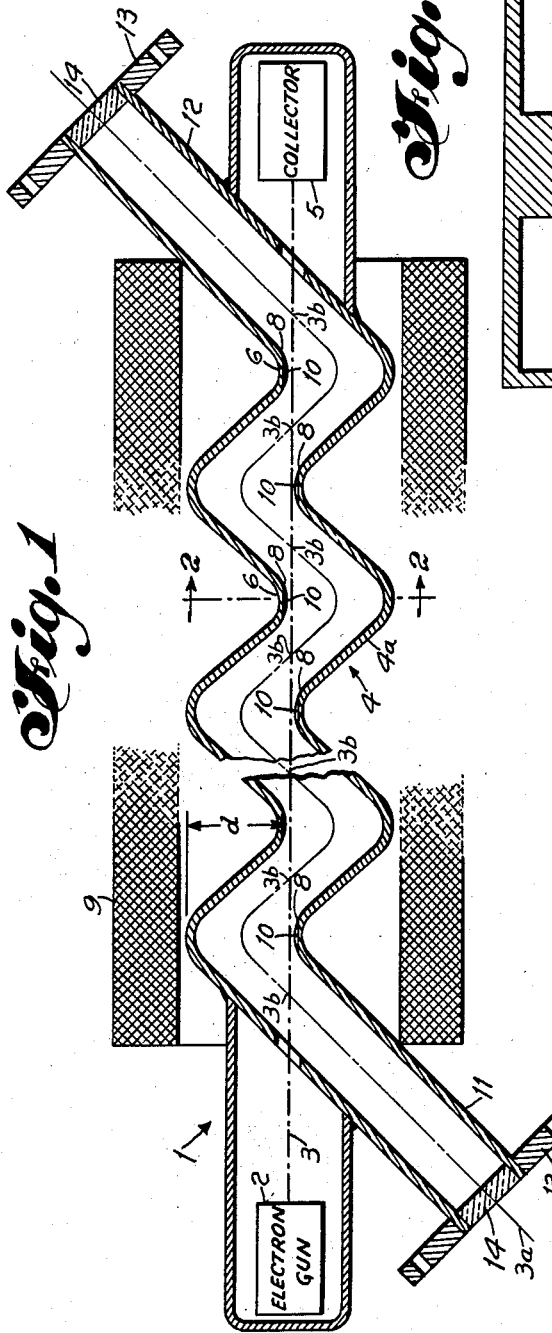
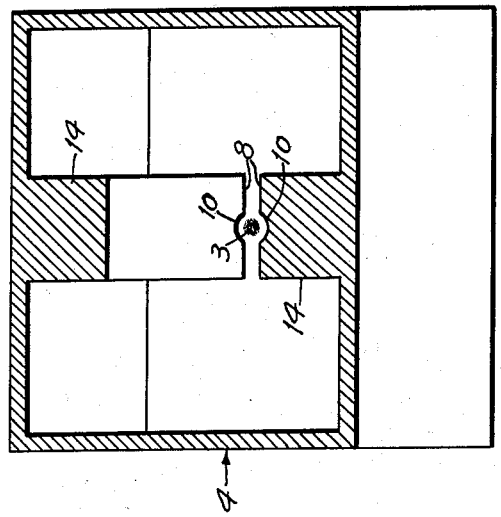
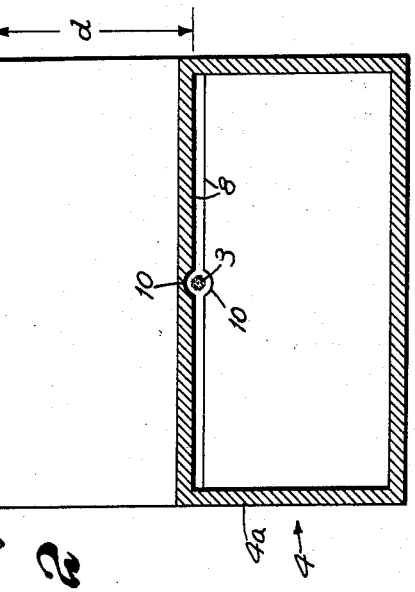
Inventor
ROBERT W. WILMARTH
By Alfred C. Hill
Agent

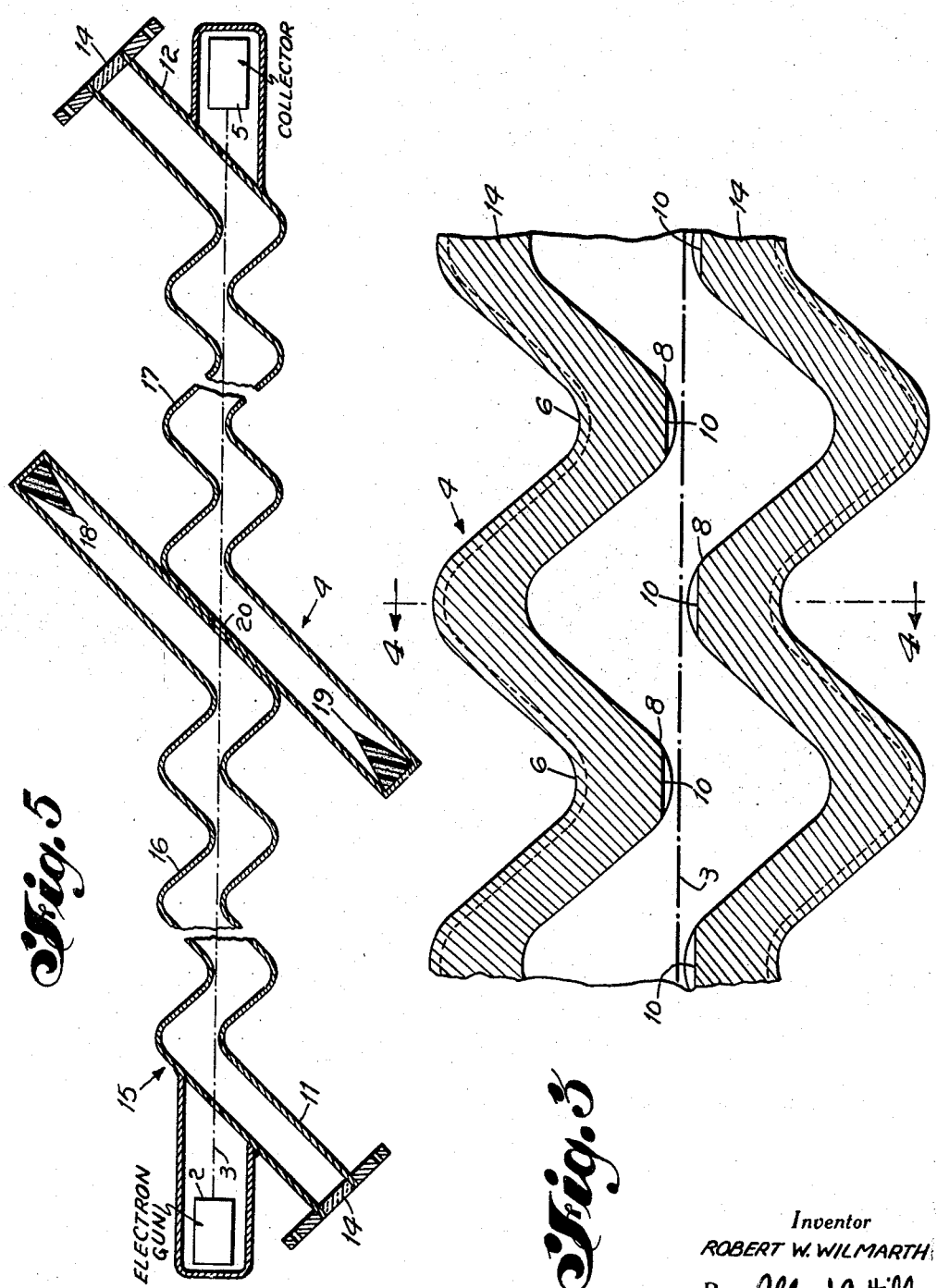

2,959,707
SLOW WAVE PROPAGATING STRUCTURE

Robert W. Wilmarth, Bloomfield, N.J., assignor to International Telephone and Telegraph Corporation, Nutley, N.J., a corporation of Maryland Filed Mar. 3, 1958, Ser. No. 718,699
11 Claims. (Cl. 315—3.5)

This invention relates to traveling wave tubes and more particularly to slow wave propagating structures for high power traveling wave tubes and the like.

Electron discharge devices of the traveling wave type have come into prominence in recent years due to the advantages, with respect to bandwidth and tunability, that they possess when compared with klystrons. Generally, the broad bandwidth of traveling wave tubes is associated with the use of a helix for a slow wave propagating structure. The helix has the added advantage of being relatively easy to couple energy to over a relatively wide range of frequencies. Further, energy attenuation is a relatively simple matter when a helical slow wave propagating structure is being used in that attenuating material may be distributed along its length or in given portions thereof to prevent unwanted oscillatory conditions when the tube is used as an amplifier. In spite of the advantages outlined, traveling wave tubes of the helical slow wave propagating structure type are limited in their application in that they have a maximum average power output which is relatively low when compared with klystrons and with the power output requirements for present day systems.

The power output of traveling wave tubes with helix-type slow wave propagating structures is limited by the following factors. Any increase in power output of a tube requires an increase in beam power which can be accomplished by increasing the beam current and the accelerating voltage. Because the power density in the beam must be maintained at reasonable levels, the helix and beam diameters must be increased. The increase in helix diameter causes large amounts of energy to be stored in the space-harmonic field, and the fundamental helix impedance is reduced with a consequent increase in the tendency toward backward-wave oscillations. The result is that small-diameter helices must be used in conjunction with higher power densities in the beam. This combination, however, suffers from the fact that it has limited heat dissipating capabilities and, hence, cannot provide the high power outputs required.

An alternative structure which has good power handling capabilities is the periodic or loaded waveguide slow wave propagating structure. However, the advantages gained in power handling capacity are somewhat offset by the fact that the bandwidth of the loaded waveguide is relatively narrow.

It is, therefore, an object of this invention to provide an improved slow wave propagating structure for traveling wave tubes.

Another object of this invention is to provide a slow wave propagating structure for traveling wave tubes with improved power handling capabilities.

Still another object of this invention is to provide a slow wave propagating structure for traveling wave tubes which is easily matched to conventional radio frequency transmission lines, such as waveguides and coaxial transmission lines, employing conventional transmission line techniques.

A feature of this invention is the provision of a slow wave propagating structure including a hollow transmission line which has a plurality of bends constituting zig-zag wall sections disposed toward and away and in non-intersecting relationship with the longitudinal axis of the slow wave structure. The waveguide or transmission center line, however, intersects the longitudinal axis in zig-zag fashion at periodically spaced points along the axis.

Another feature of this invention is the provision of a slow wave structure which may be employed in traveling wave tubes including a hollow transmission line having a plurality of bends such that the depth of the bends permits the unimpeded passage of an electron beam through the slow wave structure.

Still another feature of this invention is the provision of grooves or depressions in wall portions of the bends, when the bends are substantially tangent to an electron beam, to permit unimpeded passage of the electron beam through the slow wave structure.

A further feature of this invention is the utilization of a bent ridged waveguide to form the zig-zag slow wave propagating structure to obtain a higher impedance structure than provided by a rectangular waveguide.

The above-mentioned and other features and objects of this invention will become more apparent by reference to the following description taken in conjunction with the accompanying drawings, in which:

Fig. 1 is a longitudinal cross-sectional view of a traveling wave tube including a slow wave propagating structure following the principles of this invention;

Fig. 2 is a cross-sectional view taken along the line 2—2 of Fig. 1;

Fig. 3 is a longitudinal cross-sectional view of another form of slow wave propagating structure following the principles of this invention;

Fig. 4 is a cross-sectional view taken along the line 4—4 of Fig. 3; and

Fig. 5 is a longitudinal cross-sectional view of a traveling wave amplifier including a slow wave propagating structure following the principles of this invention.

Referring to Figs. 1 and 2, there is disclosed therein a traveling wave tube 1 in which electron gun 2 projects an electron beam along a given beam path, preferably axial of tube 1, through slow wave propagating structure 4 to collector element 5. Structure 4 acts to modify the velocity of radio frequency energy to permit proper interaction with the electron beam. The slow wave propagating structure 4 in accordance with this invention comprises a hollow transmission line 4a, such as a rectangular or circular waveguide, having a plurality of bends 6. The bends 6 constitute zig-zag wall sections of transmission line 4a disposed toward and away, in non-intersecting relation, and symmetrically about the electron beam 3. Center line 3a of hollow transmission line 4a intersects the electron beam 3, which is coincident with the longitudinal axis of tube 1, in zig-zag relation at periodic points 3b spaced therealong and center line 3a accordingly traces a cosinusoidal path through tube 1. Attention is directed to the fact that the bends are not limited to the cosinusoidal function as shown herein but that any function may be used as long as the criterion that the bends recur at a periodic interval is fulfilled. Slow wave propagating structure 4 is made of a conductive metal such as copper. This fact along with the rather large surface area exposed to the atmosphere permits heat to be dissipated rather easily. This permits higher power operation than could be obtained when using helical type slow wave structures.

In Figs. 1 and 2, the depth of the bends is defined by the letter $d$. The depth $d$ of the bends 6 is such that inner wall portions 8 of bends 6 are substantially tangent to electron beam 3 and preferably never cross the path of beam 3. Electron beam 3 in Figs. 1 and 2 is shown to be a solid circular beam magnetically focused by solenoid 9, but it may take the form of what is generally known as a sheet beam. In order to insure that no beam interception occurs on the portions 8 of bends 6, depressions or grooves 10 may be cut in the inner wall portions 8 of bends 6. In the instance where a sheet beam is used, the depression 10 would extend substantially the whole width of the slow wave propagating structure 4 at the inner wall portions 8 of bends 6. It should be pointed out that if depth $d$ is such that the bends 6 are spaced from the path of beam 3 sufficiently to permit unimpeded passage thereof, depressions 10 are not necessary.

The embodiment shown in Fig. 1 has an input connection 11 and an output connection 12 to couple radio frequency energy in the $TE_{10}$ mode to the slow wave structure 4 and to couple the amplified radio frequency energy from the interaction region, respectively. The connections 11 and 12 are extensions of transmission line 4a and have the same cross section as line 4a, such as rectangular if line 4a is rectangular. Flanged portions 13 are provided to permit connection to mating flanges on waveguides which are connected to the input and output of traveling wave tube 1. Other types of connections may be made to connections 11 and 12, such as a transducer between coaxial and waveguide transmission lines. Vacuum windows 14 may be positioned at the input 11 and output 12 to maintain a high vacuum condition within the tube after it has been processed on a high vacuum pump. The windows which are permeable to radio frequency energy are of a type well-known to one skilled in the art.

In Fig. 2 the cross section of the slow wave structure is shown to be rectangular. It should, however, be understood that this showing is not meant to be a limitation on the scope of this invention. The slow wave structure 4 may be a hollow circular waveguide. An embodiment using a circular waveguide would also be subject to the same criteria as set down for the rectangular waveguide embodiment, i.e., the bends must constitute zig-zag wall portions disposed toward and away in non-intersecting relationship with respect to a given axis; must be disposed symmetrically about a given path; must have portions substantially tangent to said given path; and finally and most importantly, the center line of the bends must intersect the given axis in zig-zig relation at a periodic interval along the given axis.

The above criteria may also be applied to a ridged waveguide embodiment shown in Figs. 3 and 4. In Figs. 3 and 4, slow wave structure 4 is made of a double ridged waveguide wherein ridges 14 follow the undulations of the bends 6 and provide a higher interaction impedance than either the rectangular or circular waveguide embodiments. Fig. 3 shows the ridges 14 substantially tangent to electron beam 3 at portions 8 of bends 6. In order to minimize beam interception, depressions or grooves 10 may be cut in portions 8 of bends 6 as indicated in Figs. 3 and 4. In a variation of the double ridge waveguide technique, the walls of the slow wave structure may be made parallel to the electron beam path and the ridges may be formed to assume the shape of the bends. The bent ridges of course would be required to fulfill all the requirements set forth for the walls of the slow wave structures previously described.

Referring to Fig. 5, a two-section slow wave propagating structure following the principles of this invention is shown in a traveling wave tube 15 which is indicative of the versatility and utility of the structure of the present application. The slow wave propagating structure 4 includes a first or input portion 16 and a second or output portion 17, each of which individually must meet the criteria set forth hereinabove. Portion 16 of slow wave propagating structure 4 is terminated with a radio frequency attenuation means 18. The input terminal of portion 17 of slow wave structure 4 is likewise terminated in a radio frequency attenuating means 19. The walls of portions 16 and 17 may be fastened together by some known technique and an aperture 20 is provided therein to permit passage of electron beam 3.

The two-section slow wave propagating structure provides a means for isolating the input and output of the propagating structure and thereby substantially eliminates oscillations therein when functioning as an amplifier. The means for isolating operates as follows. Radio frequency energy from input terminal 11 interacts with electron beam 3 in portion 16 of slow wave structure 4. The radio frequency energy, after suitably interacting with electron beam 3 to sufficiently density modulate said beam, is dissipated in attenuating means 18 and energy is coupled by means of the beam 3 to the portion 17 of slow wave structure 4. Again, after suitable interaction with electron beam 3, amplified energy is coupled to a utilization device by output terminal 12. Reflections, which may be set up due to discontinuities and the like and which may lead to undesired oscillatory conditions, are reflected back toward the input. The reflections, however, are dissipated in radio frequency attenuating means 19, and instabilities in tube operation from this source are substantially eliminated.

The foregoing paragraph described the operation of a traveling wave amplifier, but the devices herein described are not limited to this mode of operation. The versatility of the slow wave propagating structure of this application is such that operation of traveling wave devices, such as backward wave oscillators and backward wave amplifiers, is entirely possible. A further indication of the utility and versatility of this invention is the fact that conventional waveguide techniques for coupling energy to and from this slow wave propagating structure may be used and no serious matching problems are met with as when helical-type slow wave propagating structures are used. Thus, transitions from coaxial line may be made by inserting a probe into the input of the slow wave structure, and strip transmission line transitions are made with equal simplicity. Techniques for attenuating radio frequency energy, such as dummy loads and attenuating cards, may also be used in this type of slow wave propagating structure. Aside from these considerations of the versatility of the slow wave propagating structure, one more important fact stands out. The slow wave structure described herein possesses the added advantage of being broader band than conventional filter-type loaded wave-guide arrangements where sharp bends, discontinuities, and resonances tend to reduce the operable bandwidth. The double ridged slow wave structure embodiment shown in Fig. 3 has an increased operating bandwidth over the embodiment of Fig. 1, and this is to be expected in view of the superior bandwidth of ordinary ridged waveguide over ordinary rectangular waveguide.

Operation of the slow wave structure in a traveling wave tube environment requires that an axial component of electric field be present for interaction with an electron beam. The structure of Fig. 1, for instance, would operate in a $TE_{10}$ mode wherein the electric field is everywhere perpendicular to the broad walls of the rectangular waveguide. Because of the configuration of the bends, however, an axial component of electric field exists for interaction with the electron beam. In this manner, energy is given up by the beam to the field and amplification of the input energy occurs. It is believed, therefore, that any hollow transmission line capable of supporting a mode which provides an axial component of electric field may provide a useful output.

While I have described above the principles of my invention in connection with specific apparatus, it is to be

I claim:

1. A slow wave structure having a longitudinal axis comprising a hollow waveguide of substantially uniform cross-section having bends therein constituting zig-zag sections disposed toward and away in non-intersecting relationship with respect to said longitudinal axis to provide a component of electric field parallel to said longitudinal axis, the center line of said waveguide intersecting said longitudinal axis in zig-zag relation at periodic points spaced therealong.

2. A device according to claim 1 wherein said hollow waveguide is a rectangular waveguide.

3. A device according to claim 1 wherein said hollow waveguide is a ridged waveguide.

4. A slow wave structure having a longitudinal axis comprising a hollow waveguide of substantially uniform cross-section having bends on at least the inner surface thereof constituting zig-zag sections disposed toward and away in non-intersecting relationship with respect to said longitudinal axis to provide a component of electric field parallel to said longitudinal axis, the center line of said waveguide intersecting said longitudinal axis in zig-zag relation at periodic points spaced therealong.

5. A slow wave structure having a longitudinal axis comprising a hollow waveguide of substantially uniform cross-section having bends therein constituting zig-zag sections disposed toward and away in non-intersecting relationship with respect to said longitudinal axis and symmetrically disposed thereabout to provide a component of electric field parallel to said longitudinal axis, the center line of said waveguide intersecting said longitudinal axis in zig-zag relation at periodic points spaced therealong; portions of the inner walls of said bends being substantially tangent to the longitudinal axis of said slow wave structure.

6. In a traveling wave tube including an electron gun to project an electron beam along a given path, a slow wave propagating structure having a longitudinal axis coincident with said beam path comprising a hollow waveguide having bends therein constituting zig-zag wall sections disposed toward and away in non-intersecting relationship with respect to said longitudinal axis and symmetrically disposed thereabout, the center line of said waveguide intersecting said axis in zig-zag relation at periodic points spaced therealong, the depth of said bends being such that said electron beam passes longitudinally through said transmission line unimpeded.

7. In a traveling wave tube including an electron gun to project an electron beam along a given path, a slow wave propagating structure having a longitudinal axis coincident with said beam path comprising a hollow waveguide having bends therein constituting zig-zag wall sections disposed toward and away in non-intersecting relationship with respect to said longitudinal axis and symmetrically disposed thereabout, the center line of said waveguide intersecting said axis in zig-zag relation at periodic points spaced therealong, the depth of said bends being such that portions of the inner walls of said slow wave structure are substantially tangent to said beam path, said portions of said inner walls having depressions longitudinally disposed therein to permit said electron beam to pass longitudinally through said slow wave structure unimpeded.

8. In a traveling wave tube including an electron gun to project an electron beam along a given path, a first and second slow wave propagating structure having a longitudinal axis coincident with said beam path each comprising a hollow waveguide having bends therein constituting zig-zag wall sections disposed toward and away and in non-intersecting relationship with respect to said longitudnial axis and symmetrically disposed thereabout, the center line of said waveguide intersecting said axis in zig-zag relation at periodic points spaced therealong, and isolation means disposed between said first and second propagating structures to isolate said first propagating from said second propagating structure to prevent oscillations in said tube.

9. A device according to claim 8 wherein said isolation means includes a lossy waveguide at the terminus of said first slow wave propagating structure and a lossy waveguide at the beginning of said second slow wave propagating structure.

10. A traveling wave tube comprising an electron gun to project an electron beam along a given path, a collector electrode disposed along said beam path to collect said electron beam, a slow wave propagating structure for wave energy disposed between said electron gun and said collector having a longitudinal axis coincident with said beam path comprising a hollow waveguide having bends therein constituting zig-zag wall sections disposed toward and away in non-intersecting relationship with respect to said longitudinal axis, the center line of said waveguide intersecting said longitudinal axis in zig-zag relation at periodic points spaced therealong, portions of said wall sections being substantially tangent to said beam path, a source of wave energy input means to introduce said wave energy into said slow wave structure for interaction with said electron beam and output means to remove said wave energy from said slow wave structure after interaction.

11. In an electron discharge device of the traveling wave type including an electron gun to project an electron beam along a given path, a slow wave propagating structure having a longitudinal axis coincident with said beam path comprising a hollow waveguide having bends therein constituting zig-zag wall sections disposed toward and away in non-intersecting relationship with respect to said longitudinal axis and symmetrically disposed thereabout, the center line of said waveguide intersecting said longitudinal axis in zig-zag relation at periodic points spaced therealong the depth of said bends being such that said electron beam passes longitudinally through said transmission line unimpeded and at least means for coupling electromagnetic energy from said hollow waveguide.

References Cited in the file of this patent

UNITED STATES PATENTS

| | | |
|---|---|---|
| 2,367,295 | Llewellyn | Jan. 16, 1945 |
| 2,573,012 | Gutton et al. | Oct. 30, 1951 |
| 2,590,511 | Craig et al. | Mar. 25, 1952 |
| 2,591,350 | Gorn | Apr. 1, 1952 |
| 2,653,270 | Kompfner | Sept. 22, 1953 |
| 2,654,004 | Bailey | Sept. 29, 1953 |
| 2,758,612 | Zaleski | Aug. 14, 1956 |